H. KENNE, C. KENNE, Jr., A. KENNE, T. CARMODY & T. A. SWANSON.
GRAIN SHOCKING MACHINE.
APPLICATION FILED DEC. 28, 1912.
1,197,128.
Patented Sept. 5, 1916.
8 SHEETS—SHEET 5.
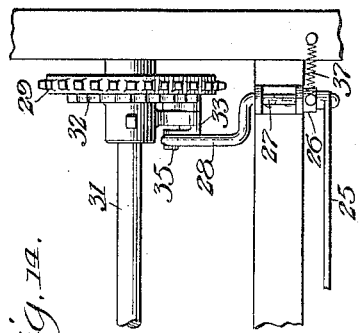
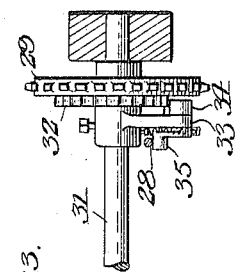
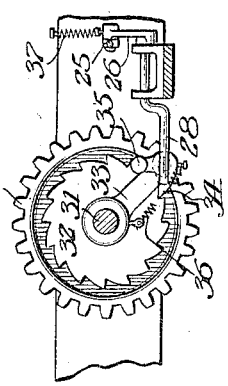
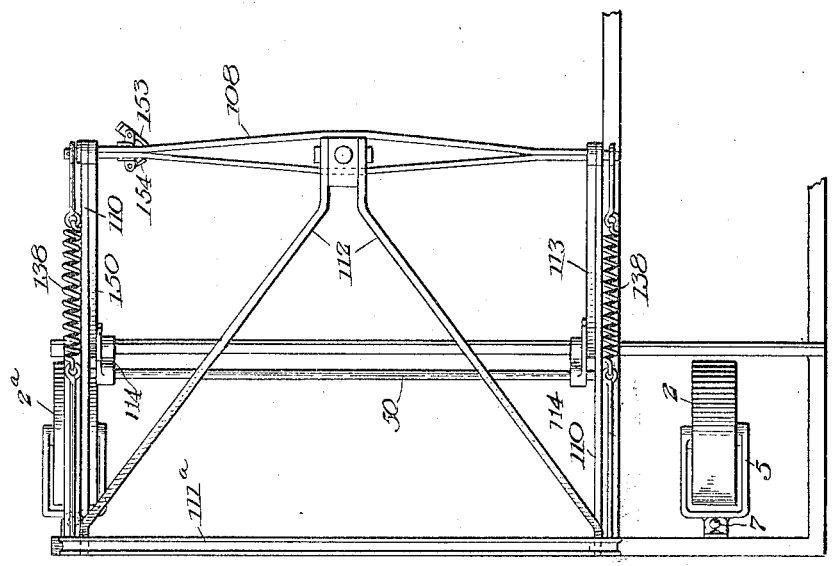
Witnesses
O. M. Hernich
A. S. Phillips
Inventors
Henry Kenne
Casper Kenne Jr.
Anthony Kenne
Thomas Carmody
Theodore A. Swanson
by Chas. C. Tillman Atty

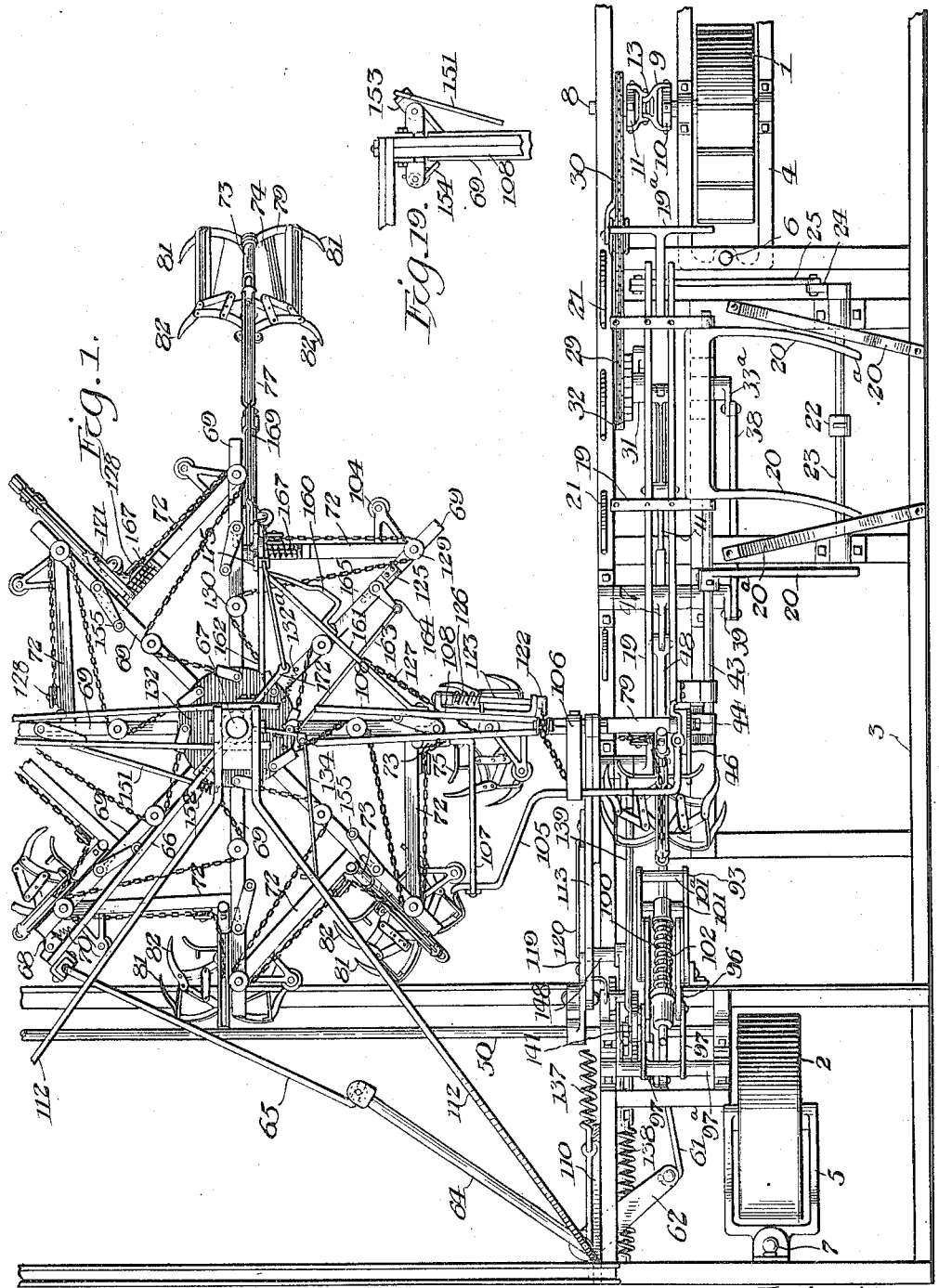

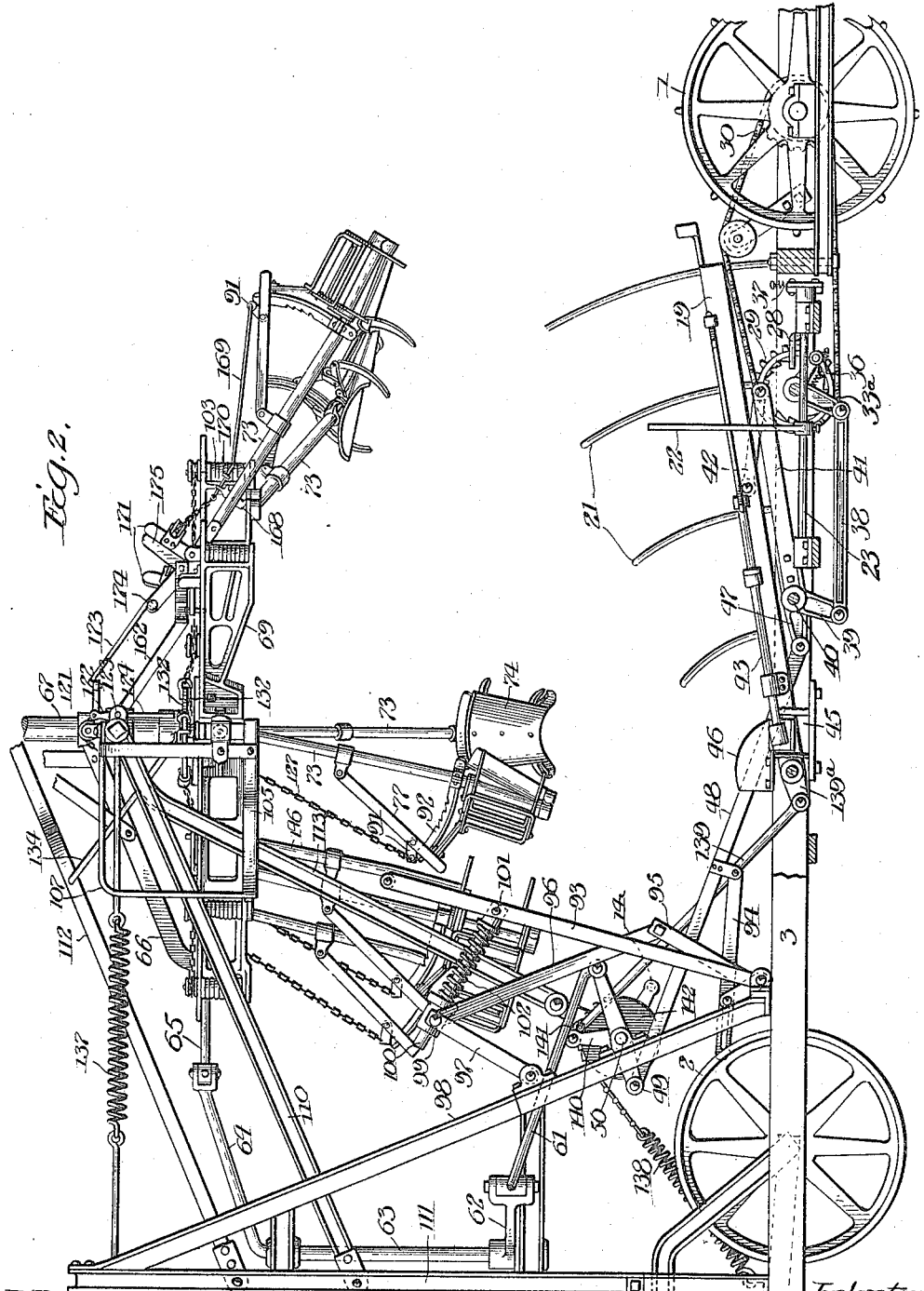

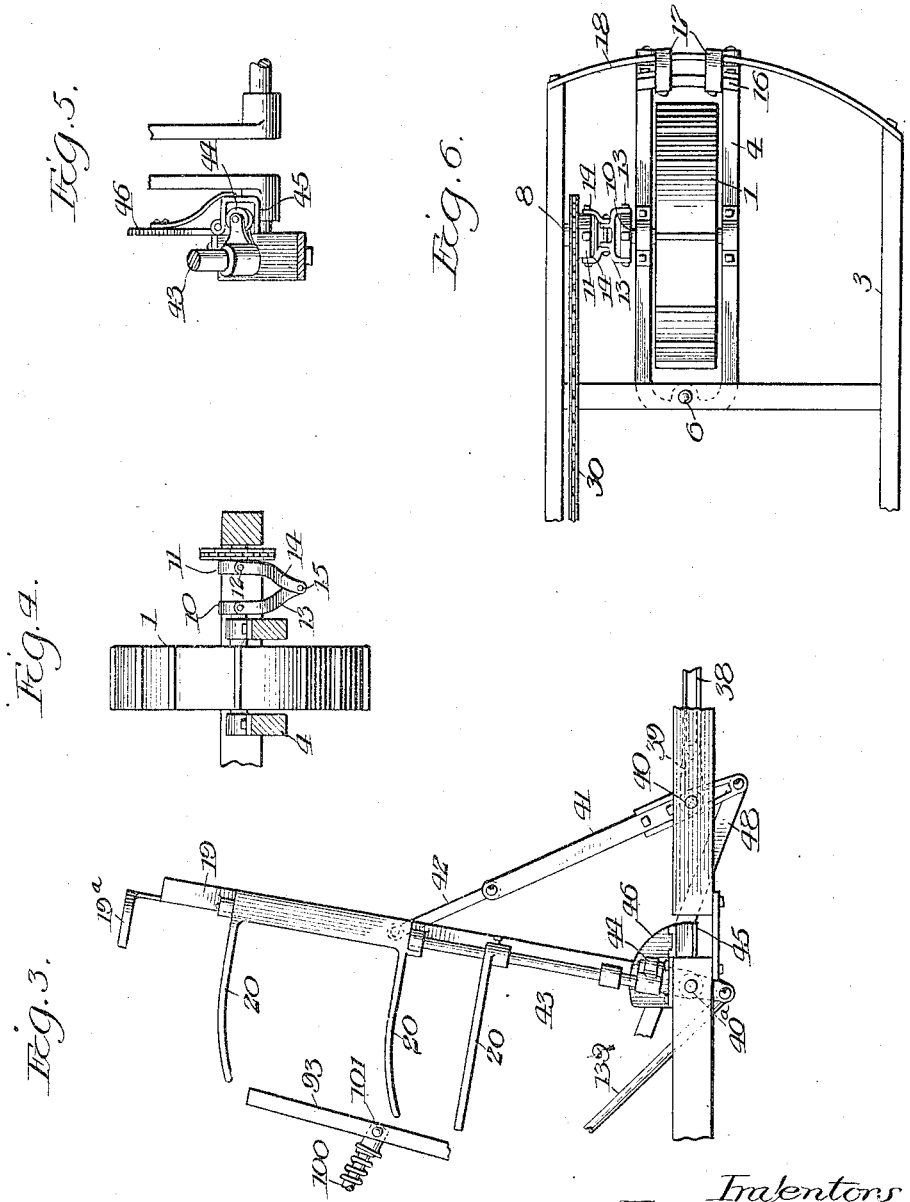

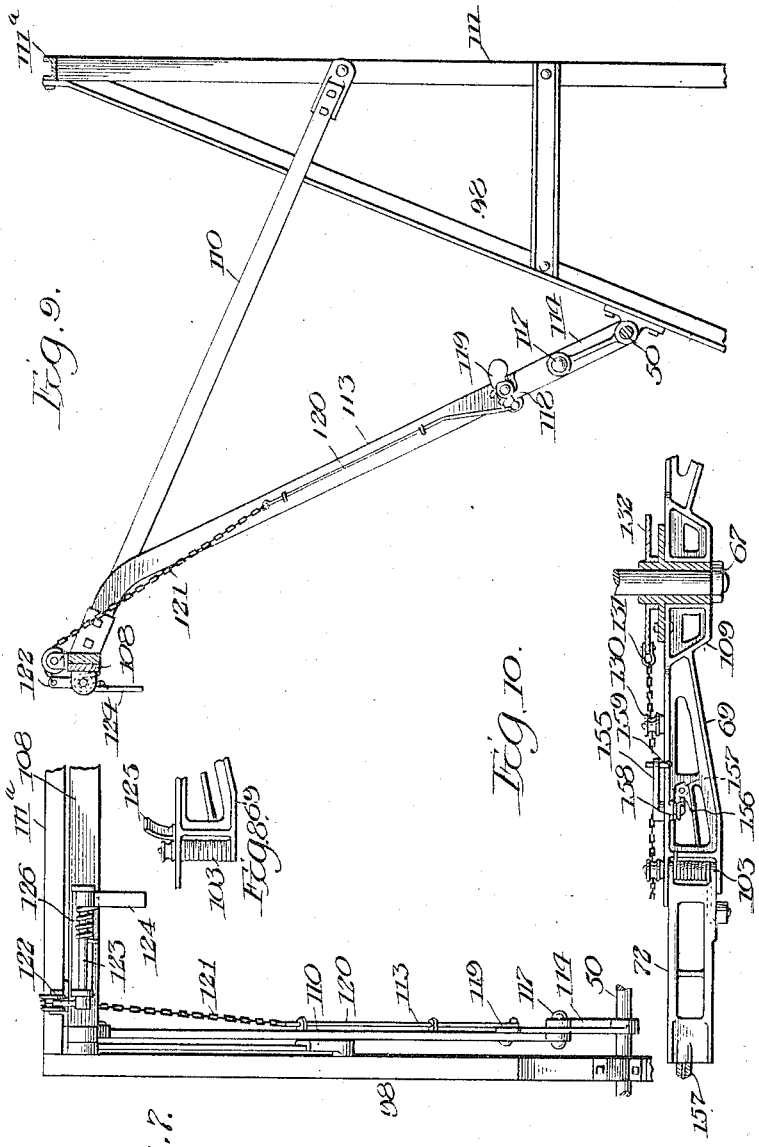

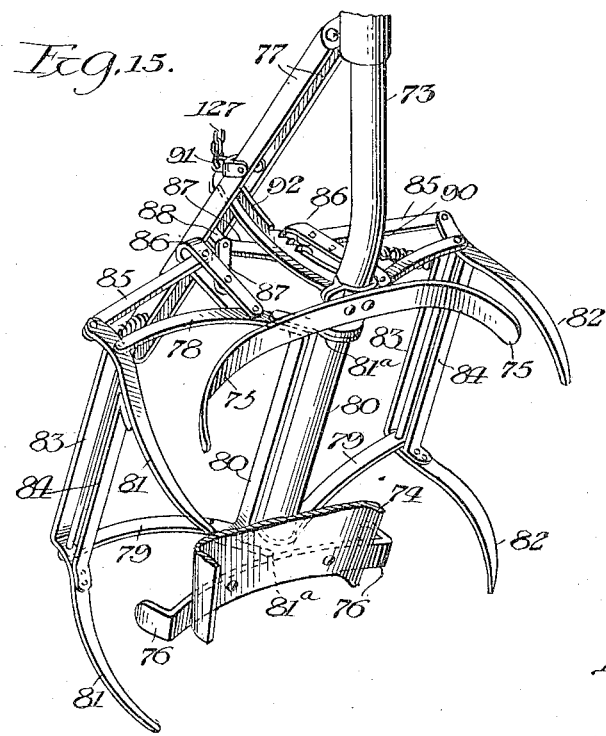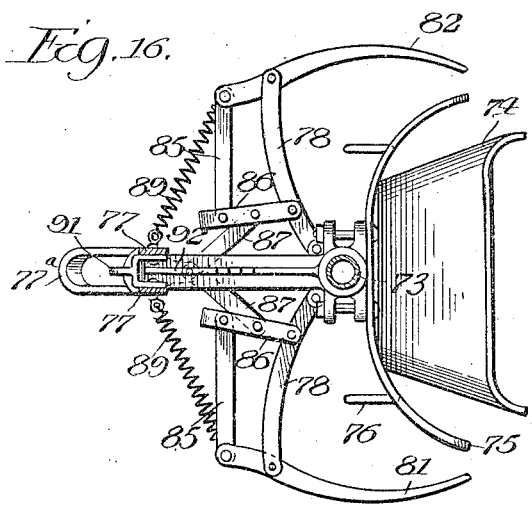

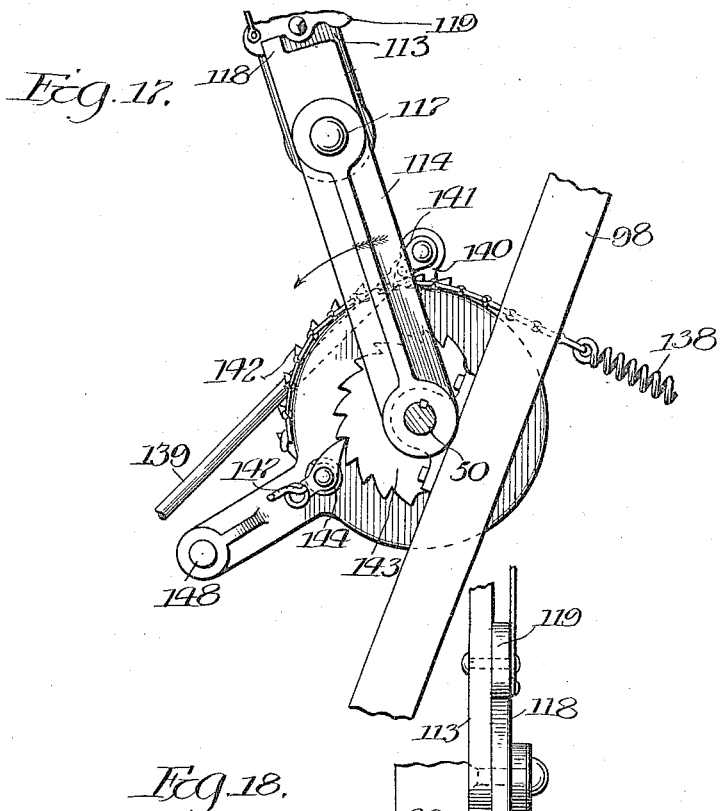
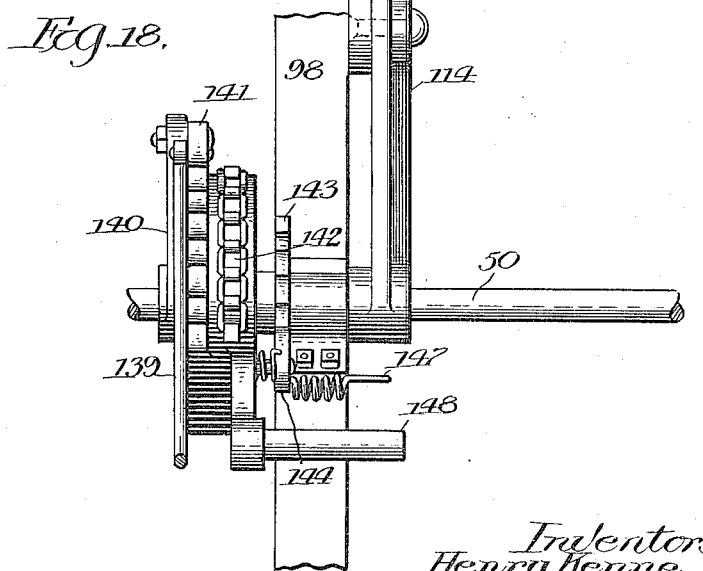

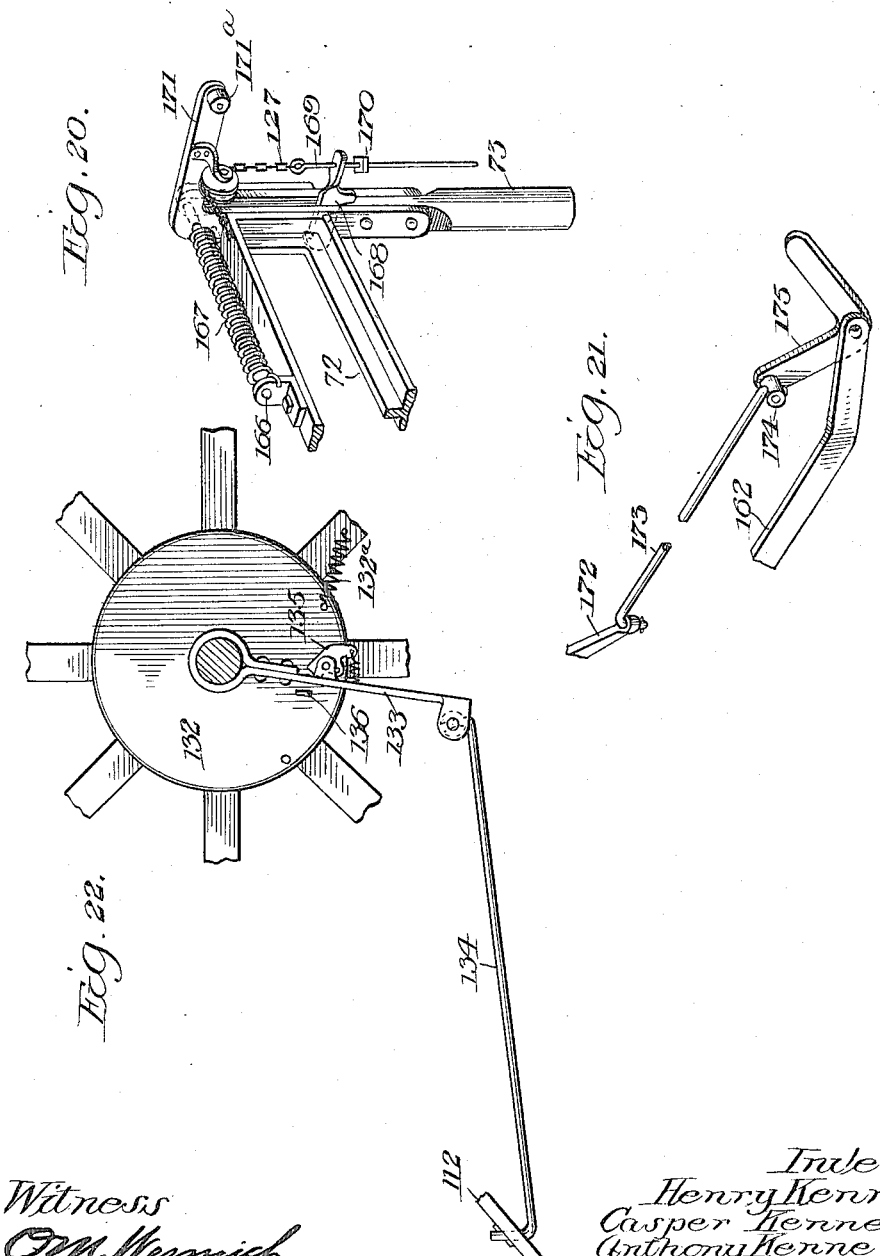

UNITED STATES PATENT OFFICE.

HENRY KENNE, CASPER KENNE, JR., ANTHONY KENNE, THOMAS CARMODY, AND THEODORE A. SWANSON, OF WHITTEMORE, IOWA.

GRAIN-SHOCKING MACHINE.

1,197,128.  Specification of Letters Patent.  Patented Sept. 5, 1916.

Application filed December 28, 1912. Serial No. 739,072.

*To all whom it may concern:*

Be it known that we, HENRY KENNE, CASPER KENNE, Jr., ANTHONY KENNE, THOMAS CARMODY, and THEODORE A. SWANSON, citizens of the United States, and residents of the town of Whittemore, in the county of Kossuth, in the State of Iowa, have invented certain new and useful Improvements in Grain-Shocking Machines, of which the following is a specification.

Our invention relates to improvements in grain shocking machines, and has as its principal object to increase the efficiency and reliability of such machines.

A further object is to reduce the cost of manufacture of grain shocking machines.

A final object resides in the particular arrangement and combination of parts hereinafter described.

With these objects in view our invention comprises means for grasping bundles of grain for raising the same and maintaining them in an elevated position and grouping them into a shock while suspended; means for folding said grasping means; means for lowering said grasping means simultaneously; and means for operating said grasping means to release said bundles to form a shock,—the cycle of operations just described is then repeated.

In the accompanying drawings which form a part of this specification, Figure 1 is a plan view of our improved machine; Fig. 2 is an elevation of the machine shown in Fig. 1 immediately after having deposited its bundles of grain to form a shock; Fig. 3 is a detailed view of the cradle mechanism of our device; Fig. 4 is a detailed view showing our improved form of universal joint; Fig. 5 is a detail of the cradle mechanism; Fig. 6 is a detail in plan of our improved wheel mounting; Figs. 7, 8 and 9 are detailed views showing the mechanisms for controlling the lowering of the grain holding devices; Fig. 10 is a detail of the arms for supporting the grain grasping devices, and of the devices for controlling the folded position of said arms, and of the mechanism for releasing the grasping devices; Fig. 11 is a fragmentary plan view of the frame for supporting the grasping devices and of the mechanism for controlling it; Figs. 12, 13, and 14 are details of the clutch mechanism for driving the shocking machine; Fig. 15 is a detail perspective view of one of the grasping devices; Fig. 16 is a plan view of the device shown in Fig. 15; Figs. 17 and 18 are detail views showing means for assisting the raising of the grasping devices; Fig. 19 is a detail showing means for holding and releasing the revolving arms; Fig. 20 is a detail perspective view of the upper part of one of the tilting arms and its support; Fig. 21 is a detail of the bell-crank mechanism for lowering the arm shown in Fig. 20, Fig. 22 is a detail of the mechanism used for rotating the disk which releases the bundle carrying arms, and Fig. 23 is a detail view of the catch which engages the rotatable arms.

Throughout the separate views the same part is referred to by the same reference character.

Referring more particularly to the drawings, 1 and 2 are wheels supporting the frame 3. Only two wheels are shown in Fig. 1, but a third wheel $2^a$ is used, being placed opposite wheel 2 as appears in Fig. 11. The wheels 1 and 2 are mounted directly in small frames 4 and 5, which are pivoted to the main frame at the points 6 and 7 respectively. Wheels 1 and 2 are thus able to swing about their pivot points to permit the machine to change its course or direction, the wheels always running in parallel lines. The wheel 1 is connected to a sprocket shaft 8 by means of a special coupling 9 appearing in Figs. 1 and 4. The coupling 9 comprises two ring members 10 and 11 mounted on the wheel shaft and on the sprocket shaft respectively. Each of the members 10 and 11 is provided with a pair of pivots 12—12 which are mounted on opposite sides of the rings, both pairs lying in the same plane. Swiveled on the pivots 12—12 are two pairs of arms 13—13 and 14—14 which embrace the rings 10 and 11 respectively and project toward each other. The links 13—14 are pivotally connected at 15 by means of a bolt or rivet midway between the planes of the rings 10 and 11. Since the links 13—14 are of greater length than the distance between the rings, the pivot point 15 normally lies considerably outside of the rings measuring from the axis of the shaft 8. By the arrangement just described the sprocket shaft 8 may be driven from the shaft of the wheel 1 without hindering the oscillation of the wheel 1 about its pivot 6, since the links 13 and 14 can easily extend to accommodate themselves to different positions while the shafts to which they are connected are rotating. The rear end of the frame 4 is provided with a crossbar 16 which supports two links or yokes 17—17. The members 17 embrace a curved guide 18 which describes an arc from the pivot 6 as a center and is attached to two parts or members of the frame 3. The guide 18 thus supports and controls the rear end of the frame 4 and guides the movement of the wheel 1 about its pivot.

In the use of our machine for making shocks of grain, bundles of grain are expected to be delivered from a binder which is operated along the side of our machine. The bundles of grain are received in a cradle 19 which is provided with a pair of arms 20, 20 normally lying in a nearly horizontal plane and extending toward the side of the machine next the binder. Two stationary arms 20$^a$, 20$^a$ are fastened to the frame and lie in the same horizontal plane as arms 20. A bundle of grain rolls over the arms 20 and 20$^a$ onto the main part of the cradle where it is stopped by the fixed vertical arms 21, on the frame. Passing onto the arms 20 and 20$^a$ a bundle of grain pushes down the lever 22 which normally stands in a vertical position projecting up between the arms 20. Lever 22 is carried by a shaft 23, which is pivoted on two cross pieces of the frame 3. The lever 22 controls a driving mechanism the details of which are shown in Figs. 12, 13 and 14. The operation is such that when it is thrown in it makes one complete revolution and then automatically disengages itself and stands in readiness to be again operated from the lever 22. The rod 23 carries a crank 24 appearing in Fig. 1 connected to which is a floating rod 25 which connects at the end opposite the crank 24 with the lever or crank 26. The lever 26 is rigid with pivoted rod 27 which is bent into a crank form and has an end or arm 28 extending in a direction at right angles to the rod 25. Now 29 is a sprocket wheel which is driven from the shaft 8 by means of the sprocket chain 30. The wheel 29 is loose on the shaft 31, and carries on its inner face a ratchet wheel 32. The wheels 29 and 32 being driven continuously while the machine is moving, it is only necessary to clutch the shaft 31 to the ratchet wheel 32 in order to put the machine into operation. The arm 33 is fastened rigidly to the shaft 31. The arm 33 is spaced from the sprocket wheel 29 sufficiently to afford room for a dog or pawl 34 which is pivoted to the arm 33 at its outer end. On the other side of the arm 33 from the dog 34 is a lever arm 35 which is rigidly connected to the dog and serves to control it. The arm 28 normally lies in contact with the upper end of the arm 35 so as to hold the dog out of engagement with the teeth of the ratchet wheel 32. This position is shown in Figs. 13 and 14. When however a bundle strikes the lever 22 the arm 28 is operated by the connection just described and removed from contact with the arm 35. The spring 36 is then free to throw the dog into engagement with the ratchet wheel 32. Fig. 12 shows the parts under consideration immediately after the dog has been thrown into engagement and the shaft 31 has begun to revolve. As soon as a bundle has passed over the lever 22, the spring 37 restores the arm 26 and consequently the lever 22 and the arm 28 to their original position. Therefore when the arm 33 and shaft 31 have made one complete revolution the arm 28 contacts with the upper end of the arm 35 to remove the dog from engagement with the ratchet wheel 32 and stop the operation of the apparatus driven from shaft 31. An arm 33$^a$ is rigidly connected with the shaft 31.

Pivotally connected to the outer end of the arm 33$^a$ is a pitman rod 38 which has pivotal connection also with a crank arm 39. When the arm 33$^a$ revolves, rod 38 is reciprocated and the crank arm 39 is caused to oscillate about the pivot 40. Rigidly attached to the pivot 40 is a second lever arm 41 which is pivotally connected in turn at its outer end to a rod 42 which is pivoted to the central part of the cradle 19. By the connections just described the cradle 19 is caused to rise from its position in Fig. 2 to a vertical position shown in Fig. 3 and return whenever sprocket wheel 29 makes a complete revolution. As the cradle rises the arms 20 swing up so as to hold the bundle in the cradle. The movable arms 20 are connected with a shaft 43 which is journaled on the side of the cradle 19. The end of shaft 43 which is nearest the pivot 40$^a$ carries a small wheel 44 at the end of two short arms. Wheel 44 lies in a pocket 45 so long as the cradle 19 and arms 20 are in the position shown in Figs. 1 and 2. When the cradle begins to rise, however, the wheel 44 comes in contact with the side of the pocket 45 and causes the shaft 43 to turn so that the arms 20 lie in a plane at right angles to the plane of the cradle. The arms 20 are kept in this plane during the movement of the cradle by the plate 46 of segmental shape which lies in the path of movement of the roller 44 and over the face of which the roller travels.

The cradle 19 is provided with a portion 19$^a$ which is provided with a curved head or arm for supporting the heads of the grain. A crank arm 47 is formed rigid with the arms 39 and 41 and extends on the opposite side of the pivot 40 from the arm 41. Crank 47 is pivotally connected to the pitman 48 which is connected in turn to the lever 49. The lever 49 is loosely mounted on the shaft 50 and connects at the end opposite the rod 48 with a second rod 61. The rod 61 actuates in turn a crank 62 which is rigid with a pivoted shaft 63, the upper end of which forms a lever 64 connecting with a pitman 65.

66 is a crank connected with the pitman 65 and pivoted at its other end to a post 67. At the outer end of the crank 66 is a pivoted dog 68. The dog 68 is designed to connect with the outer ends of the arms 69, 69 to move these arms in a clockwise direction as seen in Fig. 1. When the arm 47 oscillates about its pivot the connecting members 48, 49, 61, 62, 63, 64 and 65 cause the lever 66 to oscillate in a horizontal plane around the post 67. When lever 66 oscillates in a clockwise direction as shown in Fig. 1 the dog 68 causes the arms 69 to move in the same direction. But when lever 66 is moving in a counter-clockwise direction dog 68 may turn on its pivot against the spring 70 so as to pass one of the arms and thus fall into position to push the arm 69 forward at the next succeeding stroke of the members 65 and 66. The arms 69 form part of a rigid structure which is pivotally supported upon the post 67, being attached at their inner ends to a central hub 109. As shown in Fig. 10 arms 69 are made in the form of cast metal brackets. The arms 69 support pivoted horizontal arms 72 which are normally folded backward so that their outer ends may be releasably held by catches mounted on the following one of the arms 69. Depending from the arms 72 at the ends removed from their connections with the arms 69 are rods or arms 73 which carry grasping devices shown in detail in Figs. 15 and 16 for seizing a bundle of grain when it is held up by the cradle in the position shown in Fig. 3.

The grasping devices just mentioned are illustrated in detail in Figs. 15 and 16. These two figures show a grasping device in the open position just as it is about to grasp a bundle of grain. As the cradle rises the bundle is pushed against the plate of sheet metal 74, shown as partly broken away in Fig. 15. Plate 74 is carried by two sets of arms 75, 76 which are fastened to the arm 73 by suitable clamps. 77—77 are a pair of arms pivoted to the arm 73 above the arm 75 and on the opposite side of 73 from members 75. Mounted to swing in a horizontal plane are two levers 78—78 mounted on opposite sides of the arm 73 in a plane at right angles to said arm just below the members 75. Levers 78 are slightly curved as shown in Fig. 16. Immediately above the arms 76 is a pair of arms 79, 79 which are supported on opposite sides of the arm 73 so as to move in a plane parallel to the plane of the arm 78. 80 is a vertical rod shown as formed integral with two of the levers 78 and 79 uniting the levers firmly together. The second rod 80 appears in dotted lines only. Each of the pivoted frames formed by two levers 78, 79 and the rod 80 is riveted to two journal brackets 81ª, 81ª which embrace the arm 73 and have lugs to which the levers are attached. Pivoted to the outer ends of the levers 78 and 79 are grasping fingers 81, 81 and 82, 82. One end of the lower fingers 81 and 82 is bent upwardly as shown at 83, 83 and attached to the upper fingers 81, 82. Near the pivot point vertical rods 84, 84 are placed between the fingers 81, 81 and 82, 82. The pairs of fingers 81, 81 and 82, 82 are thus braced together firmly by the uprights 83, 83 and 84, 84. The upper fingers 81 and 82 are pivotally connected with the links 85, 85 near their point of connection with the levers 78. The ends of the links 85, opposite the fingers 81 and 82 are connected to links 86, 86. Links 86, 86 connect in turn with the links 87, 87 and with the levers 78, 78, the point of connection between the links 86 and 87 being intermediate the points of connection between 86 and 85 and 78 respectively. Both links 87 connect with a single bolt or bar 88 fixed between the arms 77, 77. 89, 89 are springs attached at one to the arms 77, 77 and at the other end to the ends of the upper fingers 81 and 82. As will be evident from inspection of Fig. 16 the springs 89 tend to hold movable parts of the grasping device in the open position as shown in Figs. 15 and 16. However the arms 77, 77 are connected at their lower end as shown at 77ª. If now the arms 77 are pushed toward the arm 73 on which they are carried the link work previously described will force both pairs of levers 78 and 79 forward to a position near the plate 74 and at the same time will cause the fingers 81, 81 and 82, 82 to press inward at their free ends so as to grasp a bundle of grain which is being held by the cradle next the plate 74. The arm 73 is bent at the point 90 so that the plate 74 will be parallel with the cradle 19. The particular angle chosen is best adapted to place the bundle in proper position when a shock is formed as hereafter described. When the arms 77 are pushed toward 73 as just described to operate the grasping fingers, they are normally held by a latch or pawl 91 which is pivoted to the arm 77 and is adapted to engage the teeth on the upper face of the bar 92 which is fixed to the arm 73 and projects between the arms 77.

The motion of the arm 77 in operating the grasping device as just described is caused by the lever 93 illustrated in Figs. 2 and 3. The movement of the lever 93 is caused by the pitman 48 which is connected to a slotted link 94. A bell crank 95 provided with two parallel arms has a pin connection with the slot in the link 94 and is pivotally connected to two links 96, 96 which are pivoted in turn to levers 97, 97, carried by a short shaft 97ª journaled at one end to a brace 98, which is a part of the frame. At the point of connection of members 96, 96 and 97 is pivotally connected a block 99 which is drilled to receive a rod 100, there being sliding fit between members 99 and 100. The rod 100 is provided with an enlarged end pivoted to the double lever 93, 93 by a pin 101. Pin 101ª connects 93, 93 at the ends. A compression spring 102 is placed between the block 99 and the enlarged end or head of the block 100. Now when the pitman 48 is operated in connection with the raising of the cradle 19 the link work just described will force the block 99 to the right as shown in Fig. 2, compressing the spring 102 and moving the lever 93. The particular pair of arms 77 which have been brought into the plane of movement of the lever 93 will be moved to operate the corresponding grasping device. The spring 102 provides a resilient drive by means of which the grasping device is operated without shock and which automatically adjusts itself to bundles of different size or density. The arms 69 project radially from the post 67 as previously mentioned. When the grasping devices receive the bundles of grain in the manner just described the arm 72 must be extended in line with the corresponding arm 69. For this purpose each arm 69 is provided with a spring 103 which serves to swing the arm 72 out into radial position. After the arm thus extended has received its bundle of grain, the structure comprising the arms 69 is stepped around by means of the oscillating arm 66 and the connections from the cradle previously described, arms 69 being moved as the cradle is lowered to its normal position to receive the next succeeding bundle. Now each arm 72 carries a roller 104 which is mounted on a bracket extending from one side of the arm near its point of connection with the arm 69. As the arms are advanced the roller 104 belonging to the extended arm 72, comes in contact with an irregular guide or track 105. This guide is held by bracket arms 106, 107 which depend from the transverse horizontal frame 108. Guide 105 is so shaped that when any roller 104 moves along its surface the arm 72 corresponding to that particular roller 104 is folded inwardly so that it may engage a latch on the succeeding one of the arms 69.

The revolving structure of which the arms 69 form a part is clearly illustrated in Fig. 10 and comprises a casting 109 which forms a hub surrounding the lower end of the post 67 from which the arms 69 radiate. The transverse frame 108 passes on each side of the post 67 and extends from side to side of the machine in a horizontal plane some distance above the arms. The ends of the frame 108 are connected to vertical standards 111 at the front of the machine by means of rods 110. Only one such rod 110 is shown in Fig. 1 since one end of the frame 108 extends off the edge of the drawing, but the relation of the parts of the frame may be seen in Fig. 11. The post 67 however continues vertically above the frame 108 and is connected at its top with two rods 112, 112 which are spread apart as shown in Fig. 1 so as to extend outwardly to the standards 111 to which they are connected above the rods 110. Standards 111 are connected by cross bars 111ª. Rods 110 and 112 lie in parallel planes and are pivoted at each end to the standards 111 and to the frame 108 and post 67 respectively. When each of the grasping devices has received a bundle of grain it is necessary for the post 67 to descend so that the bundles may be deposited to form a shock. Ordinarily the frame 108 is supported by the toggle arms 113, 114, arm 114 being connected to the shaft 50. The toggle arms are pivoted together at point 117. The arm 114 however extends beyond the pivot 117 and is provided with a finger 118 which normally is in locking engagement with a spring operated catch or pawl 119. The arm 113 is pivoted to frame 108 at its end on the side toward the cradle. The catch 119 is connected to a rod 120 which connects in turn with a chain 121 which runs over a wheel on the frame 108 and connects with the arm 122 which is carried by a short shaft 123 journaled on the frame 108. The other end of the shaft 123 carries a depending trigger arm 124 which projects downwardly below the frame into the path of a thumb or lug 125, Fig. 8, carried at the end of a certain one of the arms 69. A spring 126 normally throws the shaft 123 in such direction as to allow the chain 121 to fall slack and permit the latch 119 to remain in engagement with the finger 118. The thumb 125 however operates the trigger against the action of the spring 126, thus lifting the latch 119 and allowing the toggle to break, whereupon the post 67 descends and the bundles are lowered close to the ground. Now the latches 91 of the grasping devices each connect with a chain 127 which runs up to a guide wheel 128 on the side of the arm 72. From wheel 128 each chain 127 runs to a second guide wheel 129 mounted at the junction of the arm 72 with 69. From wheel 129 each chain runs to a third wheel 130 carried on the following one of the arms 69 and from thence to an eye 131 pivotally connected to a plate 132. Now the plate 132 is journaled on a sleeve surrounding the post 67 just above the hub 109. Immediately above the plate 132 is an arm 133 journaled around the post 67. This arm appears in Figs. 1, 2 and 22, and is connected at its outer end with a link 134 which runs to one of the rods 112. Now when the post 67 descends its angle with the rods 112 is increased and consequently the arm 133 is swung around in a clockwise direction as viewed from Fig. 1. Arm 133 carries a spring pressed pawl 135 which depends below the arm 133 sufficiently to engage a pin 136 which projects up from the surface of the plate 132. Plate 132 rotates with hub 109, but has a lost motion connection therewith. The pawl 135 is so related to its spring and pivot that the pin 136 is permitted to pass by when the arms 69 and plate 132 are being stepped around during the process of loading the grasping devices, but when the pawl 135 moves relatively to the pin 136 it comes into positive engagement with the pin to shift the plate relatively to arms 69. As the plate shifts each of the chains 127 is operated to lift its latch 91 out of engagement with the corresponding catch 92 where upon the grasping devices are released and the bundles are deposited to form a shock. After being operated plate 132 is retracted by a spring 132ª.

The springs 137 which connect the upper part of the standards 111 with the frame 108 are placed under tension by the movement of the post 67 just described and when the weight is relieved by the dropping of the bundles these springs tend to pull the post back into its original position. This action of the springs 137 is assisted by means of a spring 138 shown in Fig. 2 which is attached to the lower forward corner of the frame on the side toward the cradle. Details of the mechanism attached to the spring 138 appear also in Figs. 17 and 18. Fig. 17 being taken from the rear of Fig. 2 and Fig. 18 being taken from the left of Fig. 17 or from the right of Fig. 2. 139 is a rod operating from the crank 139ª connected to the lower end of the cradle. Rod 139 is pivotally connected to a pawl 141 which is pivoted in turn to the end of a crank arm 140 which is journaled on the shaft 50 shown in Fig. 2. Pawl 141 engages the teeth on the disk 142 whenever the cradle is raised nearly to its uppermost position. The proportions are such that the pawl is disengaged when the cradle is lowered. The crank arm 140 and disk 142 are loosely mounted on the shaft 50 which is journaled on the standard 98. The disk 142 is attached to the end of the spring 138 by means of a chain as shown. A notched disk 143 is rigidly mounted on the standard 98. A dog 144 is held by a spring so as to normally engage the teeth or notches of the disk 143, the dog 144 being attached to the face of disk 142. The crank arm 114 previously mentioned is rigidly attached to the shaft 50 and is pivoted to an arm 113 which is connected in turn to the end of the frame 108 which is nearest the cradle. The dog 144 is provided with an ear on the opposite side of its pivot from the disk 143 and this ear carries a spring trip 147 which projects into the plane of the arm 114. The disk 142 is also provided with a radial arm which carries a pin 148 which also projects outwardly into the plane of the arm 114. Now when the grasping devices have all been filled with bundles, the link 139 will have notched up the disk 142, by means of the pawl 141 so as to place the spring 138 under tension. When therefore the toggle arms 113 and 114 are released and the frame descends to deposit the bundles the arm 114 turns down in the direction of the arrow and strikes the spring 147 and releases the dog 144 from engagement with the disk 143, whereupon the pin 148 is thrown up against the crank arm 114 by the action of the spring 138 and when the frame begins to ascend under the action of the springs 137 the spring 138 tends to straighten the arms 113 and 114, thus assisting in lifting the frame.

It will be understood that a pair of arms similar to 113 and 114 are connected between the other end of the shaft 50 and the other end of the frame 108 but that they are not provided with a catch such as 119. These last mentioned arms are shown as members 149 and 150 in Fig. 11. It follows from the fact that disk 142 is attached to shaft 50 that spring 138 insures the straightening of the toggle arms 113 and 114 when the frame rises as well as assists in lifting the frame.

It will be understood that the revolving structure comprising the arms 69 must be firmly held while a bundle is being transferred from the cradle to one of the grasping devices.

Referring to Figs. 1 and 19, 151 is a rod which is loosely mounted on the oscillating arm 66. A spring 152 is provided which allows a certain amount of relative movement between 66 and 151. At the end of the rod 151 removed from the arm 66, the rod connects with a pawl or dog 153 which is attached to and depends below the frame 108. On the opposite side of the frame 108 from the pawl 153 is a spring controlled dog 154. One of the radial arms 69 is shown held between pawl 153 and dog 154 so that it cannot move in either direction. When however the arm 66 moves in the counter-clockwise direction as shown in Fig. 1 in order to engage the catch 68 with another arm 69, the spring 152 is placed in compression drawing the rod 151 and turning the pawl 153 out of the way of the arm 69 which lies beneath the frame 108. Consequently, when the arms begin to revolve there is no resistance, but when the succeeding arm 69 reaches the frame 108, the compression of the spring 152 will have been relaxed and the pawl 153 will be in position to engage the next arm 69. As previously mentioned the arms 72 are normally held in partly folded position, and as shown in Fig. 1 each arm 72 extends in the counter-clockwise direction from its supporting arm 69, the direction of rotation of the arm 69 being clockwise. The arms 72 are sufficiently long to reach the following one of the arms 69 and each arm 69 carries a lever 155 (Fig. 10) which is pivoted to swing in a horizontal plane above the upper edge of the arm 69. A second horizontal lever 156 rigidly connected to 155, acts as a catch which engages the roller end 157 on the preceding arm 72, when it is folded inwardly. A spring 158 serves to throw the catch 156 into engaging position while a stop 159 engages the edge of the arm 69 to prevent the spring 158 from uncoiling after the catch 156 has been disengaged from the arm 72. Now the stop 159 projects above the arm 155 as shown in Fig. 10 so that when any arm 69 passes under the fixed curved cam bar 160, the arm 155 will be operated and the catch 156 released from engagement with its associated arm 72. The bar 160 is so positioned that the arm 72 which is thus released is the one carried by the arm 69 which is in the act of being moved under the frame 108 on the cradle side of the machine. When the arm 72 is released by its catch its spring 103 immediately swings it out into alinement with its supporting arm 69 and the grasping device carried by the released arm 72 is brought into position for receiving a bundle of grain. After the grasping device has received its bundle the arm 72 is folded again by the guide 105 in a manner previously described and is automatically reëngaged by the catch on the following arm. The cam bar 160 is mounted on bar 161 which forms a triangle with the frame 108 and a second bar 162. However one of the arms 69 is not provided with a catch of the type just described but is provided with a catch which is independent of bar 160. This singular catch is operated from the plate 132 by means of the rod 163. Rod 163 has a lost motion connection with a lever 164 which is pivoted to one of the arms 69. A catch lever 165 is connected with the lever 164 which serves to hold one of the arms 72. The radial distance of the arm 164 from the post 67 is sufficient to permit it to pass the bar 160 without interference. The lost motion between members 163 and 164 is adjusted so that catch 165 does not release its arm 72 until plate 132 has operated the grasping devices to release the bundles. It will be understood that the particular arm 72 which is controlled by rod 163 independent of the bar 160 is the first of the arms 72 whose associated grasping device receives a bundle from the cradle. Thus when the bundles have been deposited in a shock this arm is released in position to receive another bundle and begin a new cycle of operations.

It will be apparent that two of the arms 73 need to be lifted or tilted up from the vertical position in order to pass the shock after it has been formed. The arrangement of these two arms is shown in detail in Fig. 20. 166 is a short shaft journaled in brackets on each of two arms 72 which carry the particular arm 73 which must be raised. The two arms 73 are rigidly attached to the end of the shaft 166. A spring 167 tends normally to lift arm 73. The action of the spring 167 is restrained by a catch 168 which is carried by arm 73 and engages the lower edge of the arm 72. The catch 168 is controlled by the same chain 127 which also controls the grasping device on the tilting arm 73. This chain 127 connects with a rod 169 which runs to the catch 91 of the grasping device. Rod 169 passes through an aperture in one end of the catch 168 and is provided with a stop 170 which serves as a lost motion connection to operate catch 168 immediately after the catch 91 has been operated. These two arms 73 are restored to their normal vertical position as follows: Arm 171 extends at right angles to the arm 73 at its upper end. When arm 73 is thrown up by the spring 167 arm 171 occupies the position shown in Fig. 2. 172 is a crank arm connected with the arm 66 but extending in the opposite direction from the post 67. A rod 173 is pivoted to the end of crank 172 at one end and at its other end pivots with a pin 174 which is pivoted in turn in the end of one arm of a bell-lever 175. Now 175 is pivoted to the bar 162 so as to rock in a vertical plane. The plane of movement of the bell lever 175 is the same as that of roller 171ª on arm 171. Consequently when arm 66 is moved in the counter-clockwise direction as shown in Fig. 1 preparatory to moving the arm 69, the lever 175 will press against the first of the arms 171 to force the corresponding arm 73 down to such a position that it will be held by latch 168. Then after the arms 69 have been moved one step the second arm 73 is forced down in a similar manner.

It will be understood that while the apparatus shown and described herein is the preferred form of our invention, that various re-arrangements and modifications thereof may be made without departing from the spirit of our invention.

Having thus described our invention, what we claim is:

1. In a shocking machine in combination a device for grasping bundles, a cradle for presenting a bundle to said device, means for operating said cradle, and a lever for actuating said grasping device, and resilient means for actuating said lever.

2. In a shocking machine in combination, a grasping device to grasp a bundle, a lever for operating said device, a rod attached to said lever, a spring carried by said rod, a perforated head in which said rod is slidably mounted, and means for moving said head to compress said spring.

3. In a shocking machine in combination, a grasping device, a lever for operating said device to grasp a bundle, a rod attached to said lever, a spring carried by said rod, a perforated head in which said rod is slidably mounted, a lever to which said head is pivoted, a bell crank having an arm parallel to said lever, and a link connecting said lever and said arm.

4. In a shocking machine in combination, a grasping device, a lever for actuating said device to grasp a bundle, a rod attached to said lever, a spring carried by said rod, a perforated head in which said rod is slidably mounted, a lever to which said head is pivoted, a bell crank lever, a link connecting said arm and said bell crank, a link slidably connected to said bell crank, and means for operating said last mentioned link.

5. In a shocking machine in combination a normally elevated vertical post, a horizontal frame fixed to said post, means whereby said post is kept vertical when moved, two sets of toggle levers connected to the ends of said horizontal frame for supporting said post, a shaft to which both sets of toggles connect, a latch for normally holding one pair of toggle levers in alinement, and means for releasing said latch to permit said post to descend.

6. In a shocking machine in combination a normally elevated vertical post, a horizontal frame fixed to said post, means whereby said post is kept vertical when moved, two sets of toggle levers connected to the ends of said horizontal frame for supporting said post, a shaft to which both sets of toggles connect, a latch for normally holding one pair of toggle levers in alinement, means for releasing said latch to permit said post to descend, and a spring tending to straighten said last mentioned levers when they are bent.

7. In a grain shocking machine in combination, an oscillatable frame adapted to receive bundles of grain and deposit them in the form of a shock, an intermittently operated cradle for depositing bundles of grain upon said frame, means for operating said cradle, a spring adapted to be wound upon each operation of the cradle, and means for releasing said spring to permit same to actuate the frame to cause the frame to be moved from discharging to receiving position.

8. In a shocking machine in combination, a toggle having an arm connected to a shaft, a disk journaled on said shaft provided with notches and having an arm, a pin carried by said arm projecting into the plane of said arm, a notched disk fixedly mounted beside said disk, a pawl carried by said first disk for engaging the notches of said fixed disk, a trip carried by said pawl extending into the path of movement of said toggle arm whereby said pawl may be disengaged when said toggle is broken, a spring having one end connected to said first disk, a pawl for engaging the notches of said first disk, an arm loosely mounted on said shaft to which said last mentioned pawl is pivoted, and a reciprocating rod pivoted to said last pawl for moving said first disk and tensioning said spring.

9. In a shocking machine in combination an oscillating lever, a link connected to the end of said lever, a notched disk, an arm journaled co-axially with said disk, and a pawl pivoted to the end of said arm for engaging the notches of said disk, said pawl being pivotally connected to said link, whereby said pawl is disengaged from said notches at the beginning of its stroke but engages them toward the end of its stroke.

10. In a shocking machine in combination, an arm depending from a support, a grasping device mounted at the lower end of said arm comprising two pairs of grasping fingers mounted on opposite sides of said arm, links connected to said fingers and to each other, an arm pivoted to said first mentioned arm above the upper plane of said fingers, and a link connecting the junction of said first mentioned links with said last mentioned arm.

11. In a shocking machine in combination, an arm depending from a support, a grasping device mounted at the lower end of said arm comprising two pairs of grasping fingers mounted on opposite sides of said arm, links connected to said fingers and to each other, an arm pivoted to said first mentioned arm above the upper plane of said fingers, a link connecting the junction of said first mentioned links with said last mentioned arm, a notched rod projecting from said first mentioned arm, and a latch carried by said pivoted arm for engaging one of said notches to hold the device in closed position.

12. In a shocking machine in combination, a rotatable crank, an oscillatable lever operated from said crank, a link connected to said lever, an oscillatable arm connected to said link, a link connected to said arm having pivotal connection with a pivoted block, a crank or lever carrying said block, a vertical shaft rigid with said lever having an upwardly inclined crank or arm at its upper end, a link pivoted to said last arm, an oscillatable lever arm pivoted to said last link, a standard serving as a pivot for said last lever, a series of rotatable arms journaled on said standard, and a pawl member carried by said last oscillatable lever for moving said last mentioned arms in a given direction.

13. In a shocking machine in combination, a vertical post or standard, a series of radial arms journaled to said post, a series of arms pivoted one to each of said first arms, a latch carried by each of said arms for holding the pivoted arm on the preceding one of said first mentioned arms, said latch comprising a pivoted spring operated horizontal arm, a second arm parallel with the first having a stop normally engaging said first arm and projecting above said last mentioned arm, and a fixed guide or cam adapted to engage the upper part of said stop in order to release a pivoted arm.

14. In a shocking machine in combination, a vertical post or standard, a series of radial arms journaled at the lower end of said post, an arm pivoted to each of said arms at its outer end, a spring for swinging said pivoted arms into alinement with said radial arms, a curved track or cam plate for folding said pivoted arms contacting therewith at the outer ends during the first part of the folding movement, a roller projecting from one side of each of said pivoted arms contacting with said track near the end of said folding movement, and latches carried on said radial arms for holding said pivoted arms in folded position.

15. In a shocking machine in combination, a series of grasping devices provided with latches for holding them in closed position, a central plate to which said latches are connected, flexible connections between said latches and said plate, and means for moving said plate relatively to said grasping devices whereby said latches may be released.

16. In a shocking machine in combination, a central vertical post, a radial arm supported from said post, a pivoted arm attached to the outer end of said arm, a normally depending arm pivoted to the end of said pivoted arm provided with a lever at its upper end normally extending radially and horizontally from said post, a spring tending normally to lift said lever and depending arm from their normal positions, a lever arm journaled on said post, a link connected to said lever arm at one end, a bell crank lying in substantially the same plane as said first mentioned lever, a pin pivoted to one arm of said bell crank and pivoted also to the other end of said link, and means for oscillating said lever arm whereby said bell crank may be operated to lower said first lever and its connected arm after they have been raised by said spring.

17. In a shocking machine in combination, a grasping device, a substantially vertical arm carrying said device at its lower end, a lever rigid with said arm projecting from its upper end at right angles thereto, a horizontal shaft at right angles with said lever also rigidly connected with said arm, a spiral spring coiled about said shaft tending to throw said arm upwardly, a movable support for said shaft, a pivoted bell crank, a stationary support for said crank, means for moving said movable support to bring said lever into the plane of movement of said bell crank, a latch normally holding said arm against the action of said spring, means for releasing said latch, and means for operating said bell crank to engage said lever and thereby return said arm into such position as to reëngage said latch.

18. In a shocking machine in combination, a substantially vertical arm having a grasping device at its lower end, a horizontal arm, a horizontal shaft rigid with said depending arm, journaled in brackets on the top of said horizontal arm, a spring coiled about said shaft tending to throw said depending arm upwardly, a latch engaging the lower edge of said horizontal arm, means for releasing said latch, and means for returning said depending arm to normal position.

19. In a shocking machine in combination, a vertical post or standard, a series of radial arms mounted to rotate about said post, a series of arms pivoted to said radial arms one to each, a series of arms depending from said pivoted arms one to each, said depending arms carrying grasping devices, latches for holding said devices in closed position, a plate mounted above said radial arms for controlling said latches, means for moving said plate relatively to said radial arms, flexible members connecting said plate with said latches, and a series of guide rollers for holding said flexible members in position, each flexible member being led from its associated latch upwardly to a roller near the end of the corresponding pivoted arm, thence to a roller near the pivot point of said arm, thence to a roller intermediate the ends of the succeeding radial arm, and thence to a connection with said plate.

20. In a shocking machine in combination, an elongated horizontal frame, a series of arms adapted to pass beneath said frame, means for giving said arms a step-by-step movement, a spring operated latch or pawl carried at one end of said frame in the path of movement of said arms, said pawl being adapted to permit the passage of said arms in one direction only, a second latch or finger carried by said frame immediately opposite said pawl, said second latch being adapted to prevent the movement of said arms in the direction permitted by said first mentioned latch whereby said arms are normally held fixed, a rod connected to said second latch, and to said operating means, and a spring interposed between said rod and said means.

21. In a shocking machine in combination, a series of arms radiating from a common center, a series of arms pivoted to said radial arms one to each, means for latching each of said pivoted arms to the succeeding one of said radial arms, a series of grasping devices carried from said pivotal arms, latches for holding said devices in closed position, a plate pivoted on the axis from which said arms radiate, connections between said latches and said plate, means for operating said plate to release said latches, and means for releasing one of said pivoted arms from its latching means operated from said plate.

22. In a shocking machine in combination, a vertical post or standard, radial arms journaled to said post, a series of arms pivoted to said radial arms one to each, means for latching each of said pivoted arms to the succeeding one of the radial arms, a plate journaled on said post, a rod connected to said plate and having lost motion connection with one of said latching means, and means for moving said plate relatively to said arms in order to engage said rod with its associated latching means thereby releasing one of said arms.

23. In a shocking machine in combination, a stationary frame, an oscillatory frame, means mounted upon said oscillatory frame to receive bundles of grain to form a shock while in its uppermost position, flexible connection between both of said frames to permit the lowering of said oscillatory frame, an intermittently operated cradle for depositing bundles of grain upon said oscillatory frame, a spring adapted to be wound upon each operation of the cradle, and means for releasing said spring to restore said oscillatable frame to its receiving position.

24. In a shocking machine, in combination, a stationary frame, an oscillating frame, grasping means mounted upon said oscillating frame adapted to receive bundles of grain to form a shock while in its uppermost position, flexible connections between both of said frames, a movable cradle for depositing bundles of grain upon the oscillatory frame, a spring adapted to be wound upon operation of the cradle, and means operable after a predetermined number of bundles have been deposited upon the grasping means to set the shock, and means for restoring said second mentioned frame when in this position, said means including said spring.

25. In a machine of the class described, in combination with a rotatable frame work, means for periodically rotating said frame work, a plurality of radially mounted jointed arms extending from said frame work, grasping devices provided upon said arms, adapted to receive bundles, means for depositing a bundle upon each arm, a stationary member for moving each of the arms inwardly after it has received its bundle, and means for releasing said grasping devices when each arm has been moved inwardly to deposit said bundles together.

26. In a machine of the class described, the combination with a rotatable frame work, means for periodically rotating said frame work, a plurality of radially mounted jointed arms extending from said frame work, grasping devices provided upon said arms adapted to receive bundles, means for depositing a bundle upon each arm, means for moving each of said grasping devices inwardly after it has received its bundle, means for lowering said frame work when all of said arms have been moved inwardly, and a rotatable member having flexible connection with said grasping devices for releasing said grasping devices when said frame work has been lowered to deposit said bundles together.

In witness whereof, we have hereunto subscribed our names this 17th day of December A. D. 1912, in the presence of two subscribing witnesses.

HENRY KENNE.
CASPER KENNE, Jr.
ANTHONY KENNE.
THOMAS CARMODY.
THEODORE A. SWANSON.

Witnesses:
G. E. BOYLE,
FRED WEGENER.

Copies of this patent may be obtained for five cents each, by addressing the "Commissioner of Patents, Washington, D. C."